(12) United States Patent
Speigle et al.

(10) Patent No.: US 10,798,373 B2
(45) Date of Patent: Oct. 6, 2020

(54) DISPLAY CORRECTION APPARATUS, PROGRAM, AND DISPLAY CORRECTION SYSTEM

(71) Applicant: Sharp Kabushiki Kaisha, Sakai, Osaka (JP)

(72) Inventors: Jon Matthew Speigle, Vancouver, WA (US); James Zhixin Chang, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/318,788

(22) PCT Filed: Jul. 20, 2017

(86) PCT No.: PCT/JP2017/026251
§ 371 (c)(1),
(2) Date: Jan. 18, 2019

(87) PCT Pub. No.: WO2018/016572
PCT Pub. Date: Jan. 25, 2018

(65) Prior Publication Data
US 2019/0191153 A1    Jun. 20, 2019

Related U.S. Application Data

(63) Continuation of application No. 15/217,846, filed on Jul. 22, 2016, now abandoned.

(51) Int. Cl.
*H04N 17/04*    (2006.01)
*G09G 3/20*    (2006.01)
(Continued)

(52) U.S. Cl.
CPC ............ *H04N 17/04* (2013.01); *G09G 3/20* (2013.01); *G09G 3/34* (2013.01); *G09G 5/00* (2013.01);
(Continued)

(58) Field of Classification Search
None
See application file for complete search history.

(56) References Cited

U.S. PATENT DOCUMENTS 8,531,474 B2    9/2013 Chang et al.
9,390,646 B2    7/2016 Park et al.
(Continued)

FOREIGN PATENT DOCUMENTS

JP    09-084036 A    3/1997
JP    09-197999 A    7/1997
(Continued)

OTHER PUBLICATIONS

Official Communication issued in International Patent Application No. PCT/JP2017/026251, dated Oct. 17, 2017.

*Primary Examiner* — Samira Monshi
(74) *Attorney, Agent, or Firm* — Keating & Bennett, LLP

(57) ABSTRACT

Display characteristics are calculated using a first captured image for determining ambient light characteristics and a second captured image including the ambient light characteristics and the display characteristics by removing the ambient light characteristics from the second captured image, and display correction is performed based on the display characteristics. This can provide a device that saves time and effort such as moving a color-measurement device when correcting the display characteristics of one or more display devices and that is able to perform display configuration even if a large portion is illuminated by ambient illumination.

5 Claims, 13 Drawing Sheets

(51) Int. Cl.
*G09G 5/10* (2006.01)
*G09G 3/34* (2006.01)
*G09G 5/00* (2006.01)
*G09G 5/02* (2006.01)
*H04N 9/64* (2006.01)

(52) U.S. Cl.
CPC ............... *G09G 5/02* (2013.01); *G09G 5/10* (2013.01); *H04N 9/64* (2013.01)

(56) References Cited

U.S. PATENT DOCUMENTS

| | | | |
|---|---|---|---|
| 2005/0041139 A1* | 2/2005 | Lowles | G09G 3/3406 348/362 |
| 2014/0152706 A1* | 6/2014 | Park | G09G 3/2003 345/690 |
| 2015/0138240 A1 | 5/2015 | Hiranuma | |

FOREIGN PATENT DOCUMENTS

| | | |
|---|---|---|
| JP | 2005-150779 A | 6/2005 |
| JP | 2005-151418 A | 6/2005 |
| JP | 2012-198460 A | 10/2012 |
| JP | 2013-106347 A | 5/2013 |
| JP | 2015-121779 A | 7/2015 |
| WO | 2012/019937 A1 | 2/2012 |

* cited by examiner

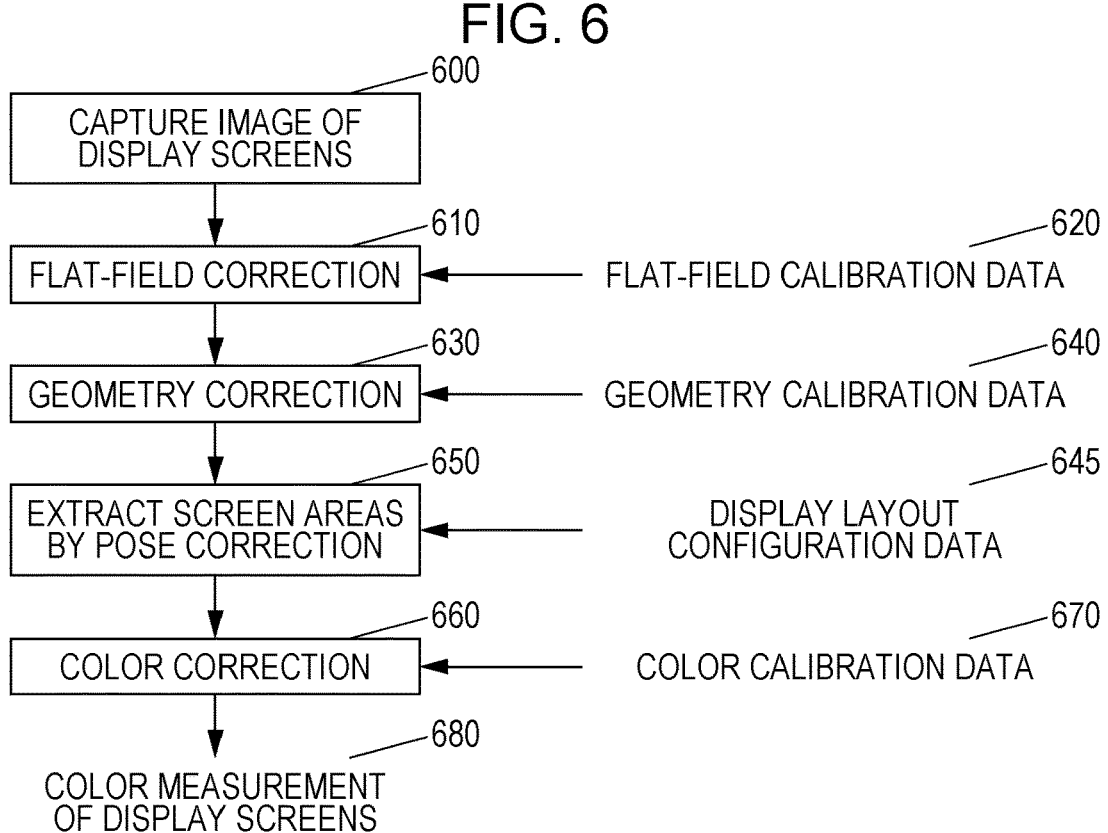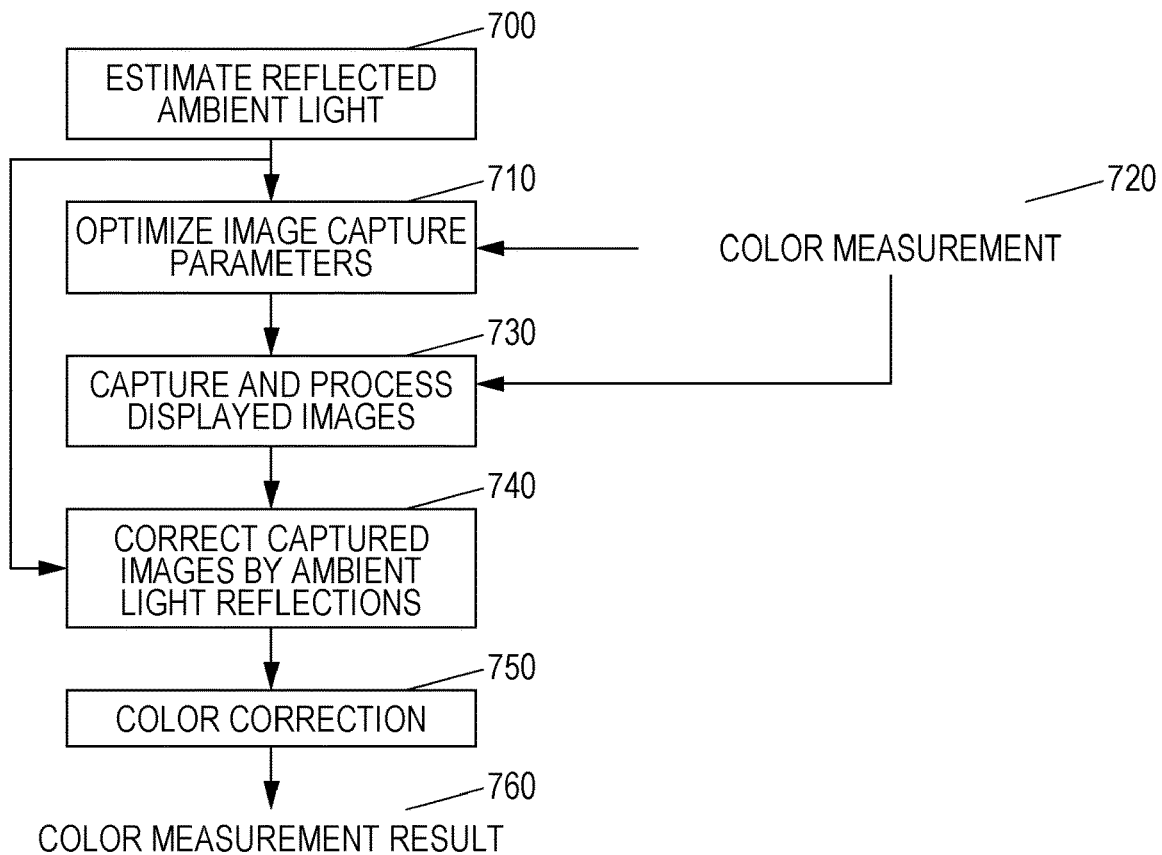

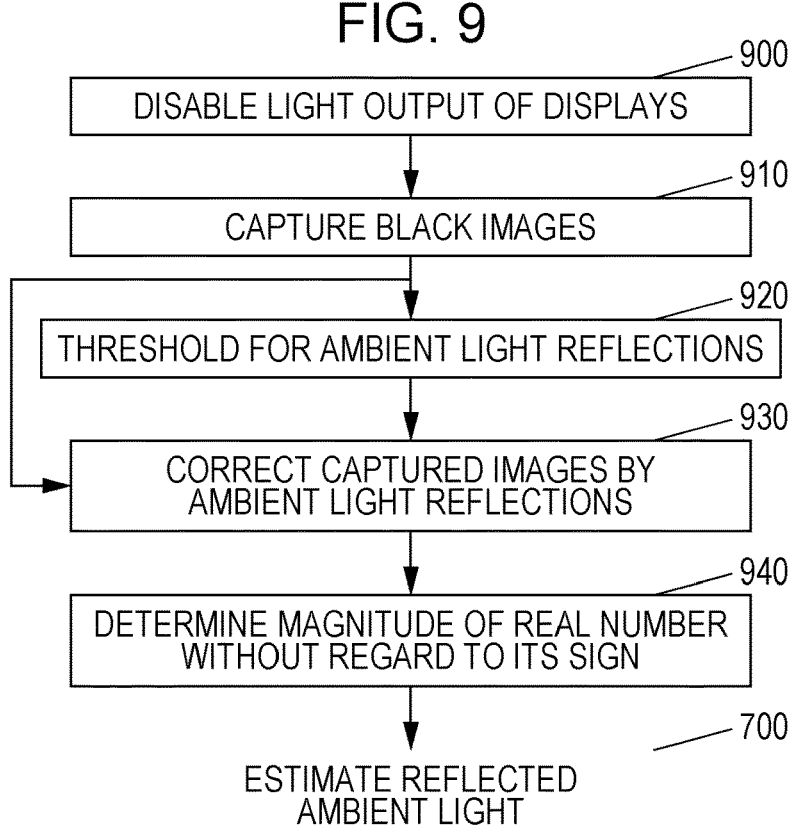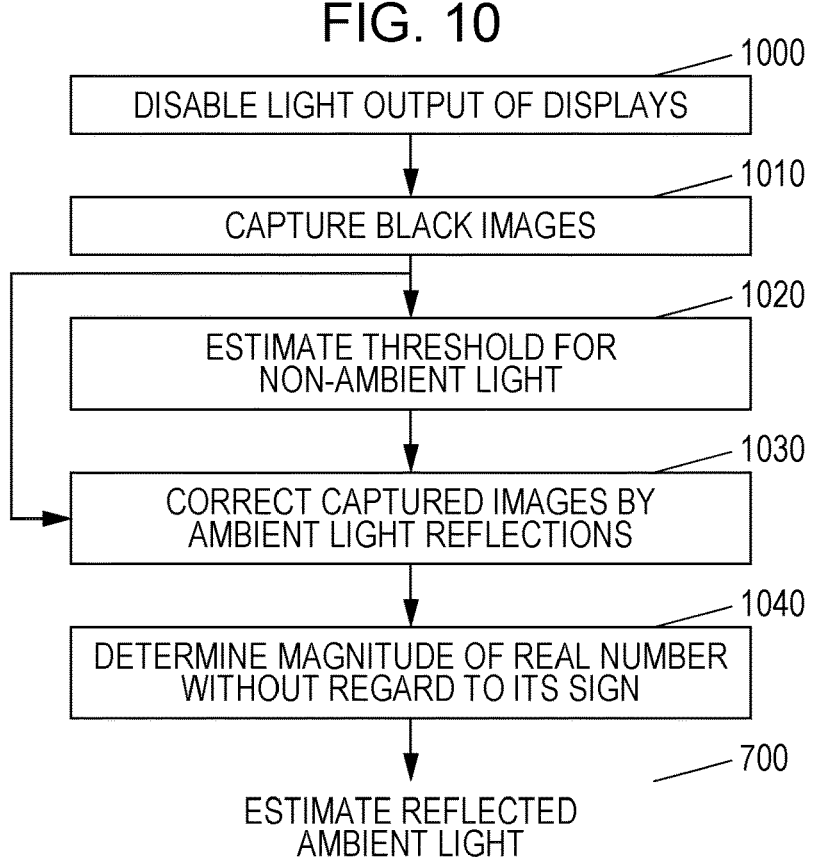

FIG. 11
(a)
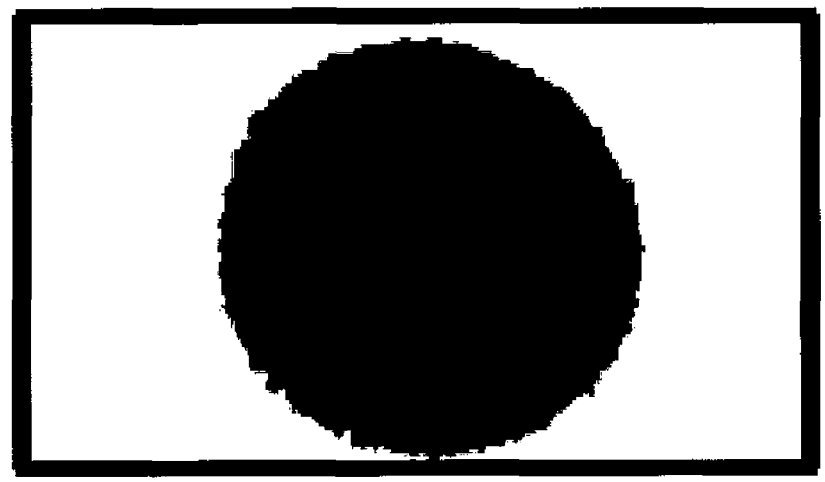
(b)
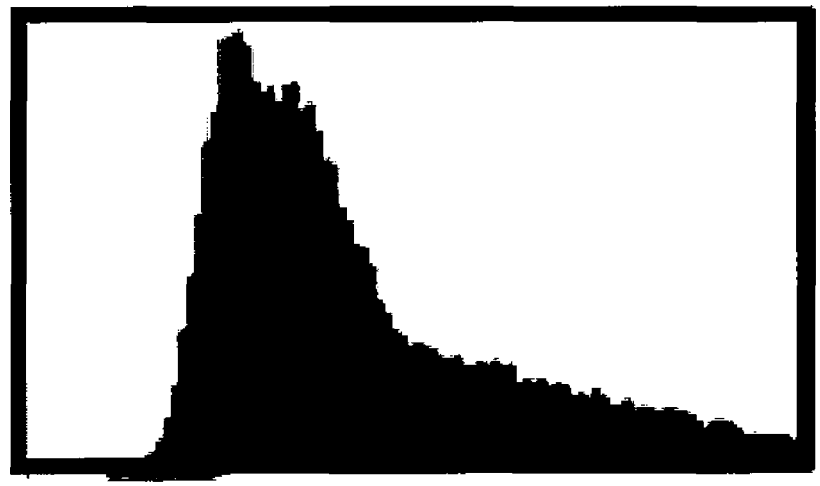

FIG. 13
(a)
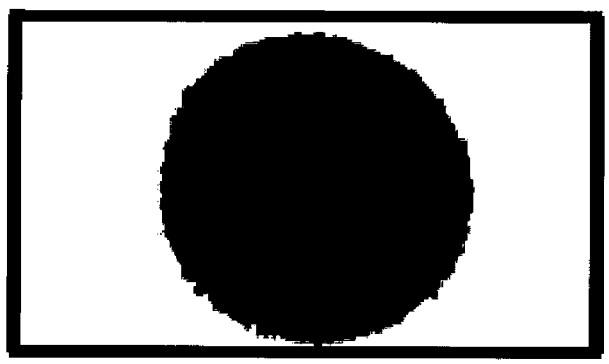
(b)
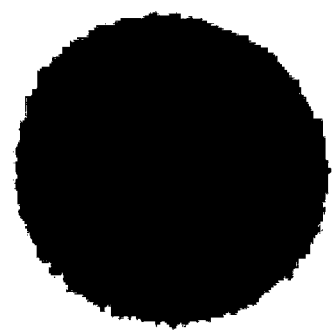
(c) LUMINANCE IN LOW-AMBIENT-LIGHT REGION
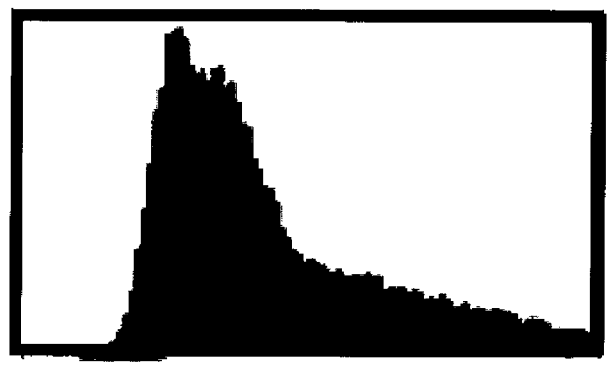

DISPLAY CORRECTION APPARATUS, PROGRAM, AND DISPLAY CORRECTION SYSTEM

TECHNICAL FIELD

The present invention relates to a display correction apparatus and the like for one or more displays.

BACKGROUND ART

Display devices typified by displays have been hitherto widely used to display presentations, display digital signage, and so on.

Characteristics of display devices differ from device to device. Flat panel displays, such as a liquid crystal display, a plasma display, and an organic EL display, desirably display a uniform grayscale image when a uniform gray level input is provided. In the case of a liquid crystal display, however, mura type defects, which affect the transmission of light through the display or are generally objectionable to viewers, are generally caused by process flaws related to cell assembly. The cyclical nature, randomness, and low contrast of such mura type defects make accurate detection and classification difficult, especially for liquid crystal displays. With manufacturing variations in various components of a display, not all devices are capable of providing uniform display properties for the entire display area. Due to such irregularities, the display devices are visually inspected to determine whether or not the devices are capable of displaying a sufficiently uniform image.

As a general matter, one particular type of irregularity that is generally relatively small and circular shaped is referred to as a newton ring mura. In general, the newton ring mura is a color-based non-uniformity that appears as a ring.

One technique to detect defects such as newton ring muras in a display is by manual visual inspection. An inspector looks at each display presenting a uniform gray level, manually identifies newton ring muras, and labels the identified newton ring muras. The process of manual visual identification tends to be inconsistent, and the identification heavily depends on the skills and expertise of the inspectors. Also, different inspectors take a different amount of time to inspect a display, together with a limited number of skilled inspectors, which limits the inspection of mass produced displays. In addition, inspectors tend to have variable inspection performance over time due to fatigue.

Color calibration is a process of measuring and/or adjusting the response of a display to a known state. In ICC (International Color Consortium) terms, this process is the basis for an additional color characterization of the device and later profiling. In non-ICC workflows, color calibration refers sometimes to establishing a known relationship with a standard color space. The device that is to be color-calibrated is sometimes known as a calibration source; the color space that serves as a standard is sometimes known as a calibration target. Color calibration is an important part of a color management workflow and is preferably performed for all displays. Unfortunately, color calibration tends to take a considerable amount of time and effort and is likely to fail.

Accordingly, several inventions have been proposed to enhance color calibration accuracy. For example, PTL 1 proposes an invention that determines a LUT (look-up table) for each display, which includes an association between an input signal value for multiple displays and an output signal value for the display, using a color measurement result obtained by a color-measurement device and an imaging result obtained by a digital camera.

Further, PTL 2 proposes an invention that measures an area where the effect of ambient illumination (reflected illumination for the surroundings) does not appear, using a first image captured with a black image presented on a display and a second image captured with a color-calibration image presented on the display, from the first image and performs color adjustment using an area of the second image corresponding to the area where the ambient illumination does not appear.

CITATION LIST

Patent Literature

PTL 1: Japanese Unexamined Patent Application Publication No. 2013-106347
PTL 2: U.S. Pat. No. 9,390,646

SUMMARY OF INVENTION

Technical Problem

In the case of color calibration or the like of displays in a multi-display configuration constituted by adjacent displays, there is a problem in that if a color-measurement device is used for the color calibration or the like, the color-measurement device needs to be moved whenever necessary since the color-measurement device can only measure the color at one screen location at a time, which is time-consuming. Another problem is that if a considerably large portion of a display is illuminated by ambient illumination, a large area may not be available for the color calibration or the like.

In light of the above issues, it is an object of the present invention to provide a display correction apparatus and the like that facilitate appropriate display correction of a display device through appropriate removal of the effect of ambient light from a captured image of a display screen of the display device.

Solution to Problem

To overcome the problems described above, a display correction apparatus of the present invention is a display correction apparatus for performing display correction of a display device having a display screen on which an image is displayable, including:

ambient light characteristic calculation means for calculating ambient light characteristics from a first captured image of the display screen obtained when the display device is in an ambient light measurement mode;

under-ambient-light display characteristic calculation means for calculating display characteristics of the display device under ambient light from a second captured image of the display screen obtained when the display device is in a normal mode;

display characteristic calculation means for calculating display characteristics of the display device by removing the ambient light characteristics from the display characteristics of the display device under ambient light; and display correction means for performing display correction based on the display characteristics of the display device.

A program of the present invention causes a computer, which performs display correction of a display device having a display screen on which an image is displayable, to execute:

an ambient light characteristic calculation function of calculating ambient light characteristics from a first captured image of the display screen obtained when the display device is in an ambient light measurement mode;

an under-ambient-light display characteristic calculation function of calculating display characteristics of the display device under ambient light from a second captured image of the display screen obtained when the display device is in a normal mode;

a display characteristic calculation function of calculating display characteristics of the display device by removing the ambient light characteristics from the display characteristics of the display device under ambient light; and a correction function of performing display correction based on the display characteristics of the display device.

A display correction system of the present invention is a display correction system including an image capture device, a display device having a display screen on which an image is displayable, and a display correction apparatus that performs display correction of the display device, wherein the image capture device transmits to the display correction apparatus a first captured image of the display screen obtained when the display device is in an ambient light measurement mode, and transmits to the display correction apparatus a second captured image of the display screen obtained when the display device is in a normal mode, and the display correction apparatus calculates ambient light characteristics from the first captured image received from the image capture device, calculates characteristics of the display device under ambient light from the second captured image received from the image capture device, calculates display characteristics of the display device by removing the ambient light characteristics from the display characteristics of the display device under ambient light, and performs display correction of the display device based on the display characteristics of the display device.

Advantageous Effects of Invention

According to the present invention, display correction based on an image captured using an image capture device can save time and effort such as moving a color-measurement device whenever necessary. In addition, display correction is performed using ambient-light-removed data, which is obtained by removing ambient light characteristics from a captured image of a display device. Thus, display correction is feasible even if a large portion is illuminated by ambient illumination.

BRIEF DESCRIPTION OF DRAWINGS

FIG. 6 is a diagram illustrating a process for display color measurement.

FIG. 7A is a diagram illustrating a process for ambient light reflections in display color measurement.

FIG. 9 is a diagram illustrating estimation of reflected ambient light using a threshold.

FIG. 10 is a diagram illustrating estimation of reflected ambient light using segmentation and histogram analysis.

FIG. 11 includes diagrams illustrating segmentation and histogram results for the estimation of ambient light reflections.

FIG. 13 includes diagrams illustrating results of the estimation of leakage light and gamma values using the display model.

DESCRIPTION OF EMBODIMENTS

The following describes an embodiment of the present invention with reference to the drawings. In this embodiment, a display device refers to a flat panel display such as a liquid crystal display, a plasma display, or an organic EL display, and these displays are called display devices. Further, display correction refers to adjusting the characteristics of a display device to a known state or to, in multi-display settings, adjusting each of the display devices constituting a multi-display configuration so that the display devices have substantially the same appearance. The characteristics (display characteristics) of a display device are mainly optical characteristics based on the light output of the display device, such as the color temperature, luminance, grayscale value, and gamma value. Further, as a specific correction method implemented as display correction, mura correction for correcting display non-uniformity or color calibration for adjusting parameters of a display device to provide sufficient color accuracy for the display device will be described.

Figure 1:
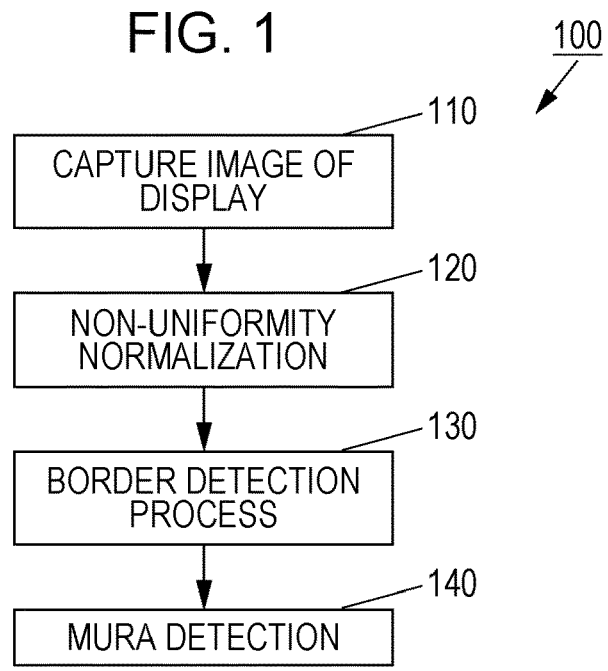
FIG. 1 is a diagram illustrating a mura detection system.

A mura detection system 100 will be described with reference to FIG. 1. First, an image of a display is captured (110) using an image capture device. Any image capture device, such as a color-measurement device, may be used to capture an image of a display at sufficiently high resolution, with a uniform grayscale or color image presented on the display.

In the case of a newton ring mura, it is generally a small circular speckle on the display, on the order of 10 pixels or less in diameter. In general, the mura is uneven patches of changes in luminance that tends to be visible particularly in dark regions of displayed screens. In some cases, it is desirable to also illuminate the display with an external light source. The captured image 110 of the display illuminated with the external light source includes a non-uniform luminance distribution across the display, which can be reduced using a non-uniformity normalization process (120).

In many cases, a self-illuminating display does not need an external light source for measurements. However, for color correction and calibration of displays in the field, an external light source may be necessary. Examples of such a mura-related technique include a typical mura-related technique disclosed in U.S. Pat. No. 8,780,097, which is incorporated herein in its entirety.

Figure 2:
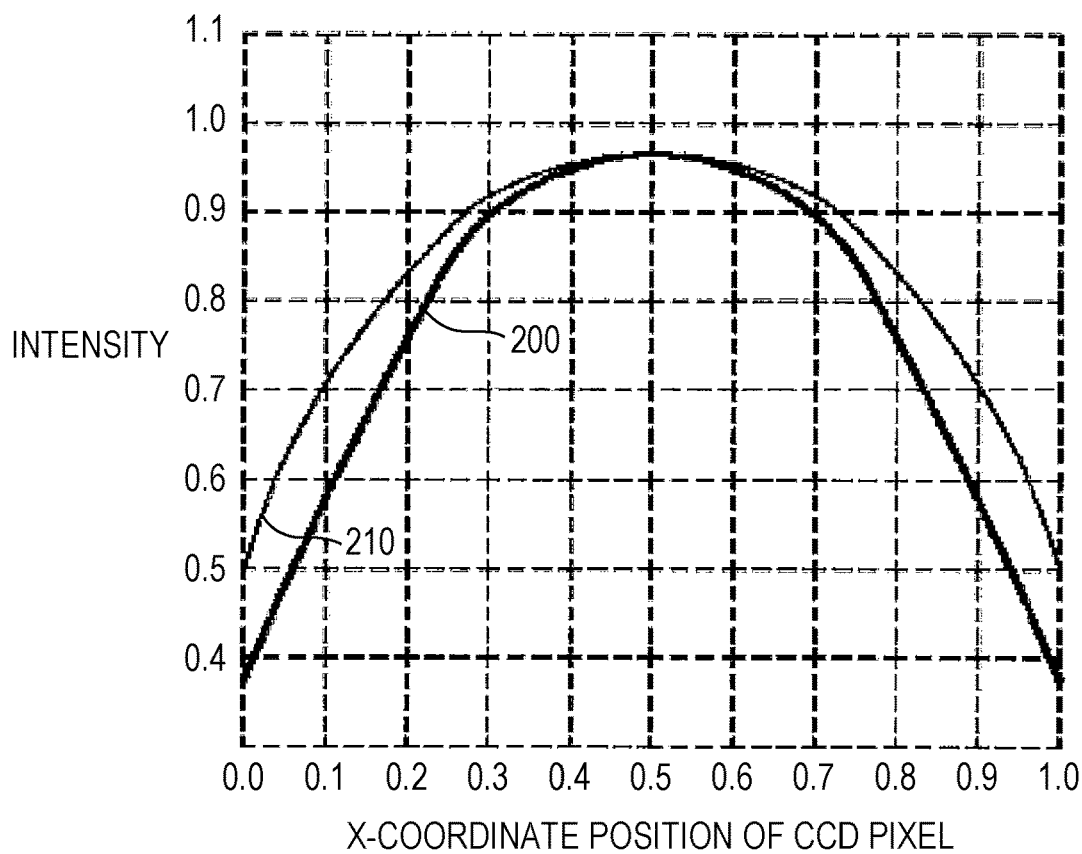
FIG. 2 is a diagram illustrating a non-uniformity correction process.

FIG. 2 is a graph with the X-coordinate positions of CCD pixels plotted on the horizontal axis and intensity plotted on the vertical axis. For a display whose center portion is illuminated, a non-uniformity curve 200, which is adjusted and measured across the display in a horizontal direction, is modified using the non-uniformity normalization process (120) to obtain a horizontally uniform luminance curve 210. The non-uniformity across the display in a longitudinal direction can also be corrected using the non-uniformity normalization process (120) to obtain a vertically uniform luminance, where necessary.

The detection of the mura is done in a frequency domain, as opposed to a spatial domain. With the detection being done in a frequency domain, the border boundary of the bright illuminated portion of the display tends to have a high-frequency response. To reduce the likelihood of false positives, a border detection process 130 is used to identify and remove the border portion of the display. As a result, only the bright illuminated portion of the display is used for mura detection. A mura detection process 140 is used to identify mura areas on the display.

The detection and adjustment of mura are also extended to multiple displays on a video wall, such as a 3 by 3 array of displays. Further, mura detection and adjustment of mura are also needed after the installation of the displays due to drift as one or more of the displays age.

Color calibration improves the display characteristics of a single display, and the display characteristics of multiple displays on a video wall, such as for digital signage. Color calibration can reduce the likelihood of observing obvious color shifts within a display or between neighboring displays on a video wall. Color calibration can also be applied to a display or displays on a video wall after display installation due to drift as one or more displays ages.

One typical technique to calibrate a color of a display or a plurality of displays such as on a video wall is to use a contact colorimeter, such as XRite i1Display Pro or Datacolor Spyder Pro, or a remote spot-measurement device, such as a Konica-Minolta CS-2000 spectroradiometer or a Konica-Minolta CS-200 color meter, to measure colors at various locations on a display or a plurality of displays on a video wall in a sequential manner. Based on the measured display color values, color processing based on software or hardware is performed to make the overall color appearance uniform across all the displays on the video wall or otherwise adjust the color appearance of a single display.

As described above, the process of color calibration is time-consuming and labor-intensive. For example, the video wall installation or maintenance personnel needs to physically place a contact colorimeter or aim a remote spot-measurement device at a target for each display on the video wall to measure the color state of the display. Furthermore, a contact colorimeter or a remote spot color measurement device can only measure the color at one screen location at a time.

Therefore, it is even more labor-intensive if colors need to be measured at a plurality of locations in a display screen area for all the displays on the video wall. Another problem is that spot-measurement devices do not facilitate pixel-wise non-uniformity correction, which requires an image sensor (imaging sensor). Therefore, non-uniformity correction, such as that resulting from mura, cannot be performed during the video wall installation or maintenance processes.

To overcome the limitations of spot-measurement devices, it is desirable to use a digital image capture device that includes a substantially two- or more dimensional point of view of the area to be measured rather than a spot-measurement device. Furthermore, the digital image capture device can simultaneously measure the display color of a major spatial region on one or more of the displays for color calibration and non-uniformity correction.

Unfortunately, the majority of image capture devices, such as consumer digital single-lens reflex cameras or inexpensive industrial cameras, have severely limited color accuracy. The limited color accuracy results in several different limitations, such as substantial mismatches between the spectral sensitivities of the image capture device and the human color matching functions, substantial image sensor non-uniformities, and substantial optical attenuation as a function of pixel position. The limited color accuracy tends to have a considerable effect on spectral or colorimetric accuracy. Moreover, ambient lighting conditions tend to have a substantial effect on the color measurement accuracy of the image capture device.

Therefore, using a color-measurement device (e.g., an image capture device), generally referred to as a camera, for color calibration and non-uniformity correction for a display or a plurality of displays on a video wall is nontrivial, especially under variable ambient lighting conditions. To more effectively use an image capture device for both color calibration and non-uniformity correction, it is desirable to reduce the effect of ambient light reflected from the display surface(s) of the display(s) to increase the accuracy of the color measurement of the display(s). As a result of detecting and compensating for ambient illumination and object reflections from the surface(s) of the display(s), a more accurate color calibration and mura correction can be performed, which are applied under ideal conditions (which would be an entirely dark room) or less that may occur during or after the installation of one or more displays.

Figure 3:
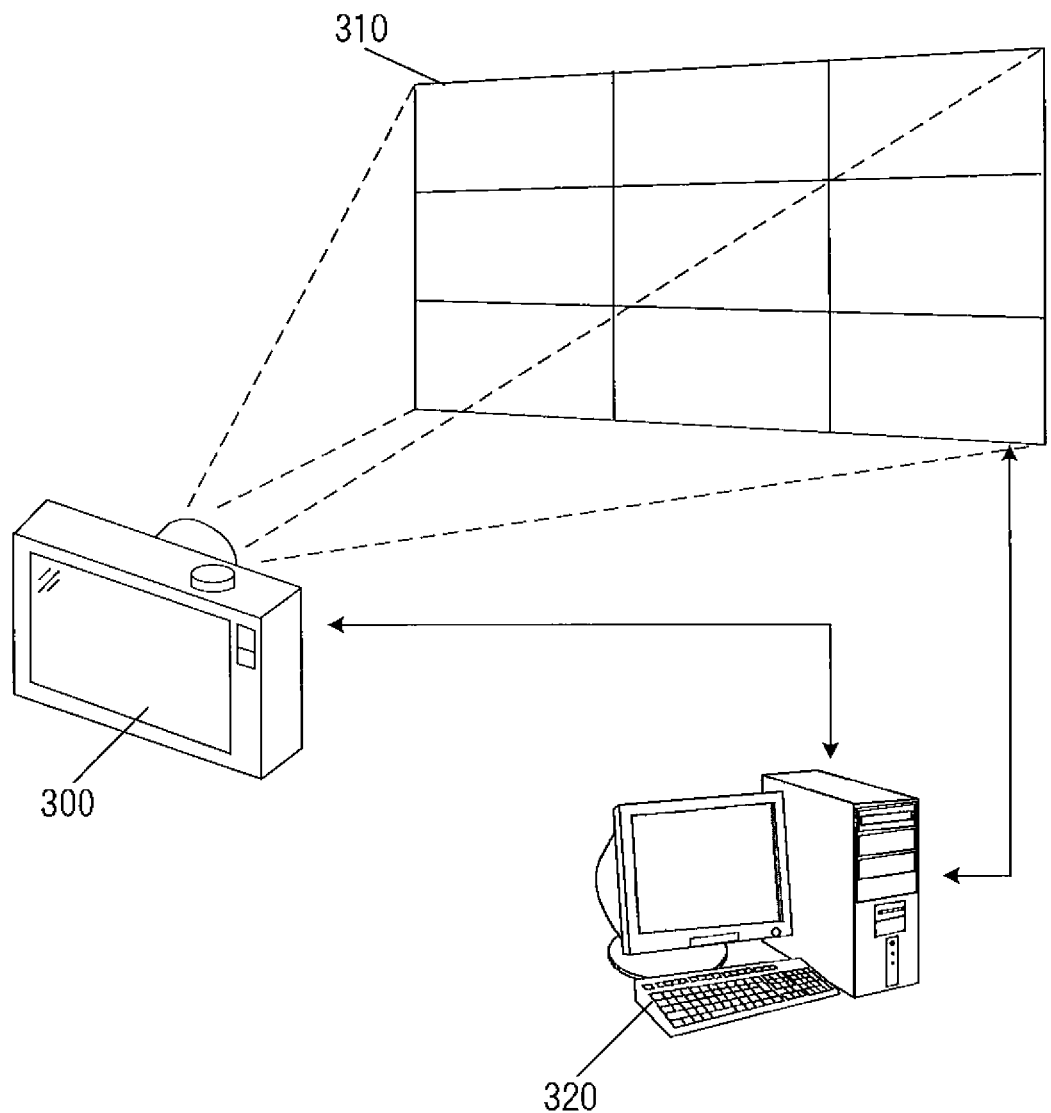
FIG. 3 is a diagram illustrating a specific example of a display correction system using an image device, a multi-screen display, and a computer.

Referring now to FIG. 3, in particular, a multi-display color calibration system will be described. Here, a color-measurement device 300 is used to measure a displayed color for a major spatial region on each display for a pre-defined set of colors. Images sensed from displays 310 are processed by a computer 320 (e.g., a desktop computer, a server, or any other information processing device).

Figure 4:
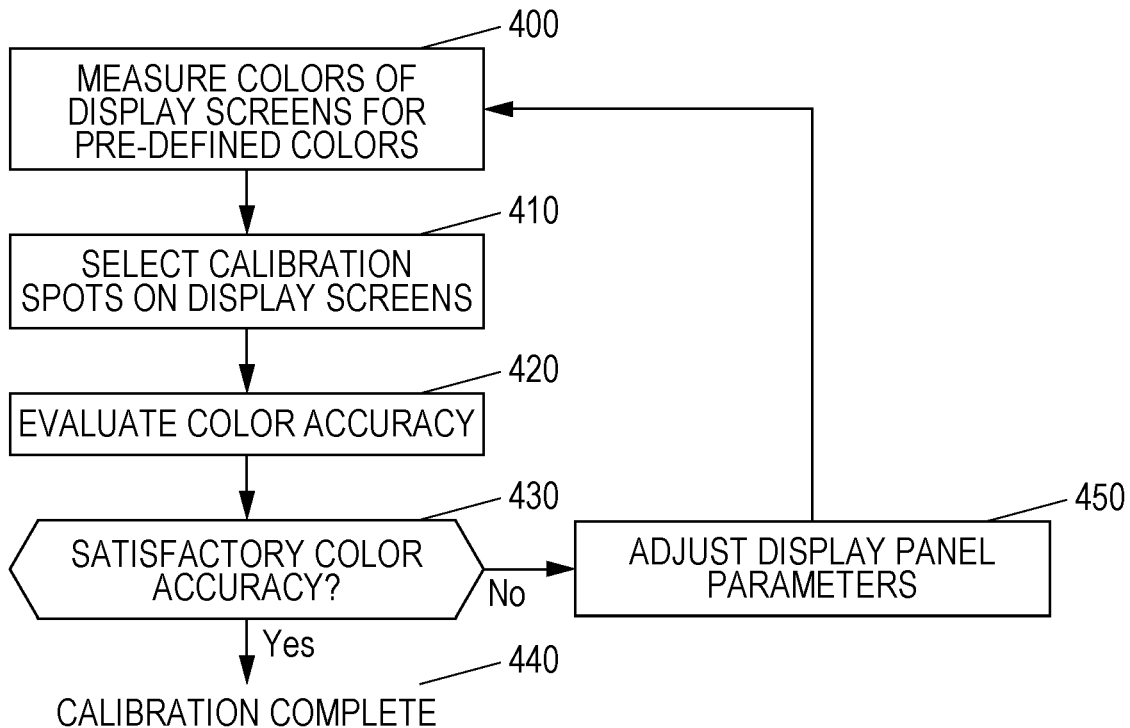
FIG. 4 is a diagram illustrating a multi-display color calibration process.

A specific example of a color calibration technique using the color-measurement device 300 of FIG. 3 is illustrated in FIG. 4. Display characteristics are calculated from a captured image obtained by the color-measurement device 300, and color calibration is performed based on the display characteristics. In the description, color (such as grayscale value or color temperature) is used as a display characteristic.

It is to be noted that device characteristics for a set of tiled displays or a single display are confounded by ambient illumination in a similar manner. For example, "calibration" is defined as adjusting display parameters until a suitable characteristic is achieved.

For example, an output characteristic could be a display profile (e.g., ICC (International Color Consortium) profile) that is applied by a computer connected to the display to images intended for display, where an sRGB image would be rendered to the device RGB values that would achieve the target CIE XYZ corresponding to the sRGB image. The computer driving tiled displays would apply an ICC profile corresponding to each of the tiled displays so that accurate color can be achieved across all the tiled displays.

First, the color-measurement device 300 measures colors on each display screen for pre-defined colors (400). A set of one or more calibration spots (a group of one or more pixels) on a screen for each of the displays is selected so as to be used for the color calibration (410).

One specific example of a technique for color calibration for the spot(s) on each screen includes computation of the black point, the white point, and the gamma value for one or more spots of the display to evaluate the color accuracy (420) of the display based on the pre-defined set of colors (400). The one or more points are regions of the display that have minimal or no ambient light reflections. For example, U.S. Pat. No. 8,773,451 discloses a color correction method and device for displays, which is incorporated by reference herein in its entirety. As an example, a determination is made whether the black point, the white point, and the gamma value for a display result in a display that has satisfactory color accuracy (430).

If the black point, the white point, and the gamma value are sufficiently satisfactory for each display, then the color calibration is complete (430; Yes→440). If the black point, the white point, and the gamma value are not sufficiently satisfactory for each display (430; No), then the display parameters for each of the display panels that are not sufficiently satisfactory are adjusted (450). After the adjustment of the display parameters, the color-measurement device 300 measures the colors of the display screens for the pre-defined colors (400). This process is repeated until the black point, the white point, and the gamma value for each display are satisfactory for color accuracy to complete the color calibration. As a result of the color calibration, the displays on the video wall have substantially the same color appearance.

Figure 5:
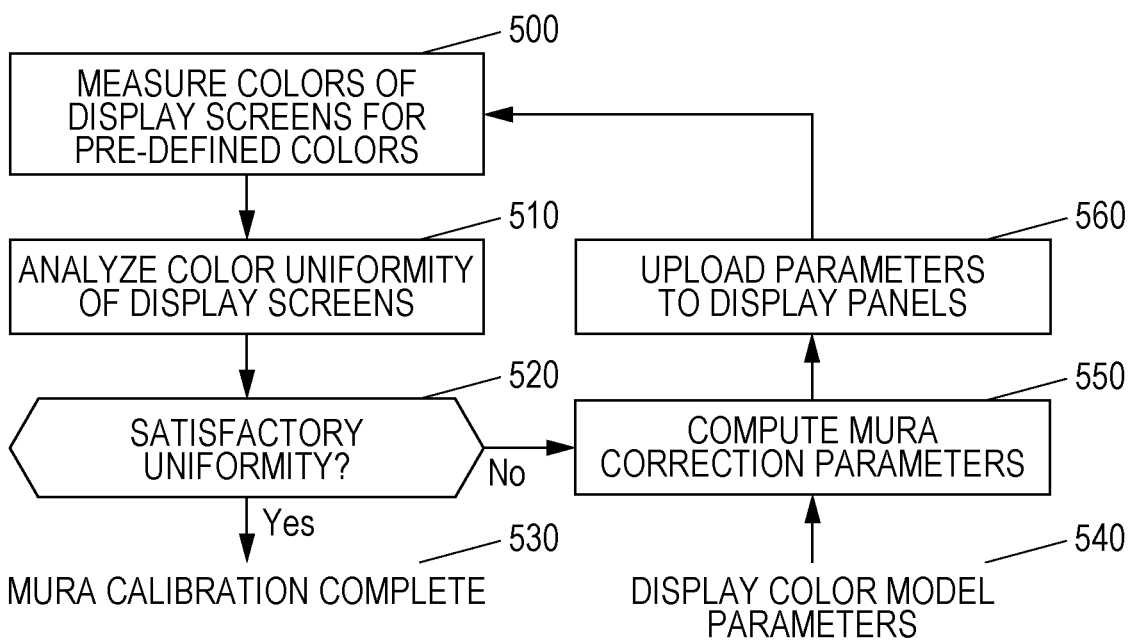
FIG. 5 is a diagram illustrating a multi-display mura correction process.

Subsequently, a specific example of a technique for mura correction using the color-measurement device 300 in FIG. 3 is illustrated in FIG. 5. The color-measurement device 300 calculates display characteristics from a captured image and performs mura correction based on the display characteristics. In the description, color (such as grayscale value or color temperature) is used as a display characteristic.

First, the displayed colors on each screen are measured for a pre-defined set of colors (500). The measurement of display screen colors may be for all or a major spatial portion for a single display or tiled displays for the pre-defined set of colors. For each color in the sensed pre-defined set of colors (500), the system can analyze the color uniformity of each of the display screens (510). For example, each of the pixels of the display screen includes colorimetric values such as CIE XYZ values that may be analyzed to determine color variations within a display screen. A determination is made whether the color uniformity is sufficiently satisfactory (520).

If the color uniformity is sufficiently satisfactory for each display, then the mura correction is complete (520; Yes→530). If the color uniformity is not sufficiently satisfactory for each display (520; No), then the system computes mura correction parameters (550) based on a set of display color model parameters 540.

The computed mura correction parameters (550) are uploaded to each of the display panels (560). After uploading the parameters to the display panels (560), the color-measurement device 300 measures the colors of each display screen for the pre-defined set of colors (500). This process is repeated until the color uniformity is satisfactory for each display to complete the mura correction. Preferably, as a result of the mura correction, each of the displays on the video wall has a substantially mura-free appearance.

Referring to FIG. 6, to increase the ability to use a device that has limited color uniformity, it is desirable to characterize characteristics of a specific color-measurement device, such as one available from Point Grey Research Inc., as a device for display color measurement. One or more pictures of one or more display screens are taken using the color-measurement device 300 (600). Preferably, a flat-field correction (610) which may be based on flat-field calibration data (620), such as a dark noise characterization, is applied to the captured image(s).

After the flat-field correction (610), a geometry correction (630) which may be based on geometry calibration data (640) is applied to the image(s) subjected to the flat-field correction. Based on the flat-field correction (610) and the geometry correction (630), the system extracts screen areas by pose correction (650), which may be based on display layout configuration data (645). The display layout configuration data identifies the position of each display within the captured screen(s). The image processing is based on a chessboard-like target image that is displayed sequentially on each screen for the estimation of the location of pixels on each screen in the captured image(s) (after compensating for lens distortions).

The lens-corrected image is mapped to an extracted image in screen-pixel coordinates for each screen. Based on the pose correction (650), a color correction (660), which may be based on color calibration data 670, is used for color calibration. By way of example, the color correction is based on U.S. Patent Application Publication No. 2005/0117186, which is incorporated by reference herein in its entirety. Data obtained as a result of the color correction (660) is color measurement data of the display screen(s) (680).

The flat-field correction (610) uses a uniform light source for characterizing the non-uniformities of the color-measurement device. These non-uniformities are then compensated for in each captured image to reduce artifacts caused by the image sensor or optical sensor. The geometry correction (630) for the images is performed using open-source computer vision libraries such as OpenCV. The geometric distortions caused by the camera and lens are referred to as intrinsic parameters. The positions of the color-measurement device relative to objects in the scene (e.g., the display surface of a display) are referred to as pose or extrinsic parameters.

For display color measurement, the color-measurement device is calibrated against a substantially more accurate color-measurement device, such as Konica-Minolta CS-2000, CA-1000, or CA-2000, or Konica-Minolta CS-200. The color-measurement device and the instrument are used to measure the same set of display colors to generate a camera color calibration transform that converts color image capture device RGB values into colorimetric values (e.g., CIEXYZ).

Even with a color-calibrated color-measurement device, it is still problematic to achieve accurate color calibration and mura correction under conditions that include relatively weak ambient light. Unlike a contact colorimeter, ambient light reflections from a display screen substantially adversely affect the accuracy of the color measurement by a color-measurement device.

That is, as in step 600, the characteristics of a captured image of a display are such that the display characteristics generally include the effect of the characteristics of ambient light (ambient light characteristics). The ambient light characteristics are optical characteristics of reflection of ambient light from a surface of a display. Therefore, it is desirable to reduce the effect of the ambient light characteristics in color calibration and mura correction for one or more displays (e.g., multiple displays).

The ambient light characteristics refer to, more precisely, by way of example, the characteristics of ambient light (color-related attributes such as luminance, color, and color temperature) in a place where the display device is installed, such as in a room. To measure the ambient light characteristics, the characteristics of light reflected on display screens of displays are used for convenience purposes. The reflected light may have different reflectances or the like depending on, for example, light emitted from backlights, different materials of the displays, and so on. Any known method can be used to remove the effect of the reflected light. The removed reflected ambient light is available as ambient light.

Figure 7B:
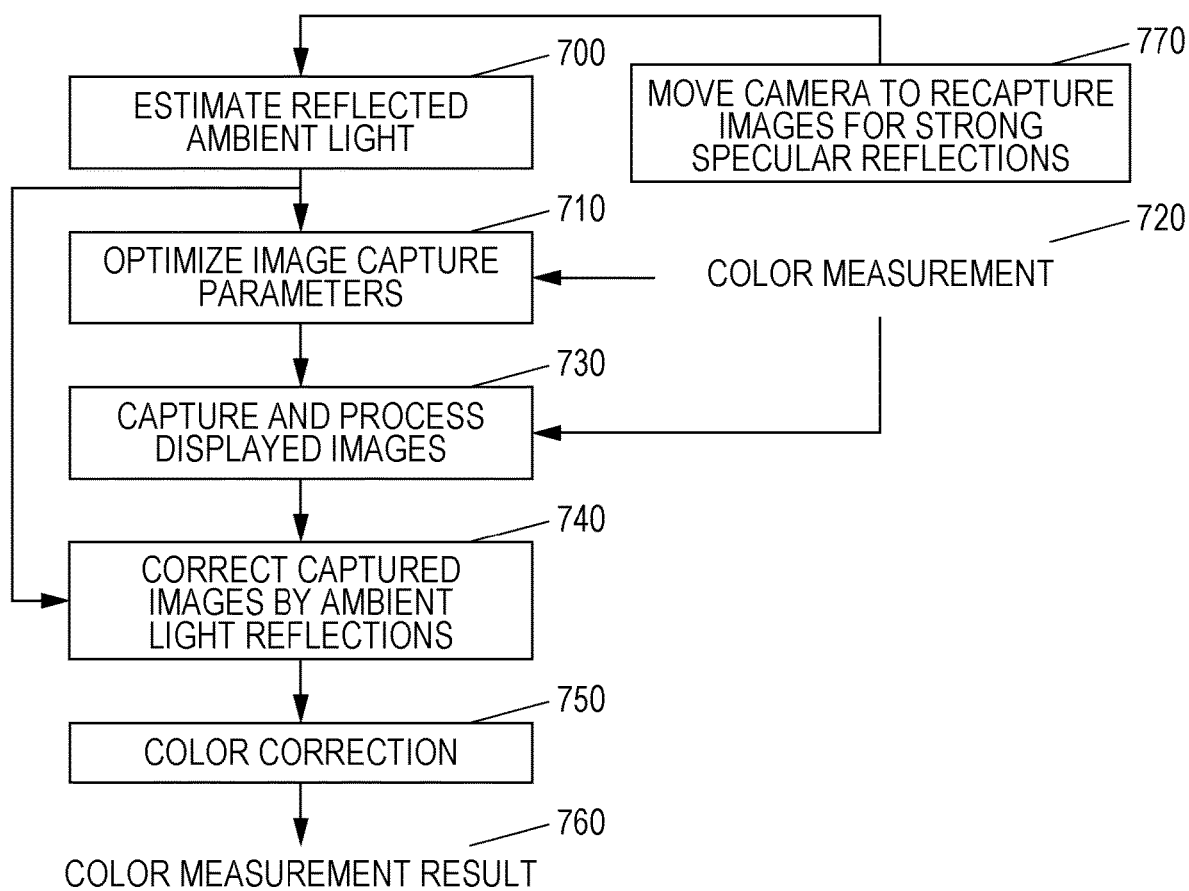
FIG. 7B is a diagram illustrating a process for ambient light reflections in display color measurement.

Referring to FIG. 7A, the reflected ambient light (described in more detail later) is estimated in a particular environment (700), and the effect of the reflected ambient light is reduced in color measurement during color calibration and mura correction for one or more displays (e.g., multiple displays). Based on the estimated reflected ambient light (700), the system optimizes the image capture parameters (710) based on the measurement of a set of measured colors (720). Preferably, for color calibration and display characterization, a selected region of the display is substantially free from reflected ambient light. The system captures and processes (730) displayed images based on the measured colors (720). The effects of the estimated reflected ambient light (700) are removed from the processed displayed images (730) to compensate for the captured images by ambient light reflections (740). A color correction (750) is applied to the compensated images (740) to generate a color measurement result (760). Referring to FIG. 7B, another technique can be used by moving the camera to recapture images to account for strong specular reflections (770). In general, the system compensates for the captured images based on ambient light using a suitable method, to determine desirable display-related characteristics.

Figure 8:
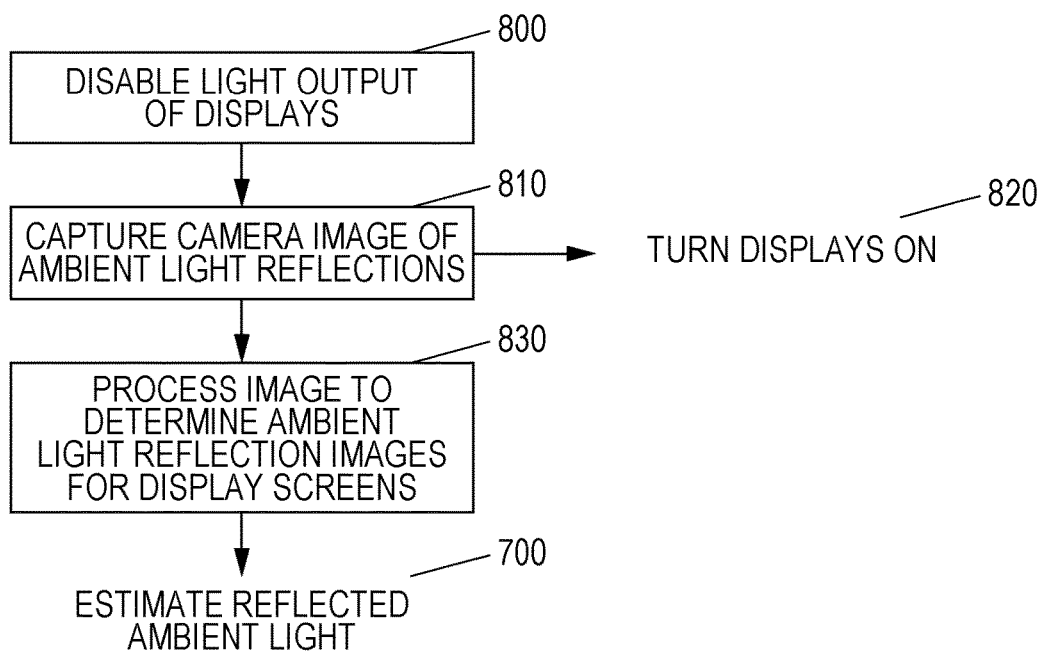
FIG. 8 is a diagram illustrating estimation of ambient light by turning displays off.

Referring to FIG. 8, one specific technique to estimate the ambient light reflected from one or more displays (700) is to turn the displays off (800) and use a color-measurement device to capture an image of one or more display screens under conditions with the presence of the reflected ambient light (810). After capturing an image of ambient light reflections (810), the displays are turned on (820). The captured image 810 is processed by the color-measurement device to determine an estimate of ambient light for each display screen and, preferably, for different regions of each display screen (830). The result of the estimation of ambient light for each display screen (830) is used as an estimate of the reflected ambient light (700). The estimate of ambient light for each display screen is used for the removal of ambient light reflections in FIG. 7A and FIG. 7B. One advantage of turning the displays off is that the ambient light reflections may be estimated by identifying and removing artifacts related to display uniformity, such as viewing-angle-dependent fall-off or mura non-uniformities, which tend to be pronounced in darker displays.

Unfortunately, the ambient light reflections tend to be level-dependent, and depend on the display pixel, the backlight intensity, and the particular design of the optical layer of the display. Additionally, turning each of the displays off and then back on tends to be time-consuming, and is problematic, especially for a large tiled-display configuration. Moreover, many applications that turn the display off and then back on which is running on a graphical computer system may cause the computer window system to reconfigure the tiled display geometry. This may require the reconfiguration of the display geometry each time the display is turned off and on, which is a time-consuming process.

A method for estimating the characteristics of the reflected ambient light without turning the displays off is illustrated in FIG. 9. One purpose of this illustration is a simple assumption that the reflected ambient light is independent of the colors on the displays. The light output of the displays is disabled (or otherwise reduced) (900), such that the displays are preferably as close to black as possible given the physical constraints of the displays. The color-measurement device captures an image of each of the black images on the displays (910). In many cases, different regions of each of the displays will reflect relatively small ambient light from the black image on the display which is observable. The captured image of the black image (910), including ambient light reflections, is then processed to identify such ambient light reflections. By way of example, a threshold for ambient light reflections 920 may be set in advance. The threshold for ambient light reflections 920 is compensated for (930) based on the captured black image 910. Then, the magnitude of the real number without regard to its sign is determined (940) to estimate the reflected ambient light (700)

An alternative method for estimating the ambient light reflections without turning the displays off is illustrated in FIG. 10. One purpose of this illustration is a simple assumption that the reflected ambient light is independent of the colors on the displays. The light output of the displays is disabled (or otherwise reduced) (1000), such that the displays are preferably as close to black as possible given the physical constraints of the displays. The color-measurement device captures an image of each of the black images on the displays (1010). In many cases, different regions of each of the displays will reflect relatively small ambient light from the black image on the display which is observable. The captured image of the black image (1010), including ambient light reflections, is then processed to identify such ambient light reflections. By way of example, a threshold for non-ambient light reflections 1020 is determined in a suitable way based on the captured black image 1010. In this example, the display is segmented into a likely ambient light region and a likely non-ambient light region. The threshold for non-ambient light 1020 is compensated for (1030) based on the captured black image. Then, the magnitude of the real number without regard to its sign is determined (1040) to estimate the reflected ambient light (700)

A specific example of the segmentation technique is illustrated in FIG. 11(*a*). FIG. 11(*a*) indicates $Y_{black} < 1$ cd/m². That is, a white area indicates the likely non-ambient light region, and this region is indicated to have a luminance less than 1 cd/m². Referring to FIG. 11(*b*), the color values in the non-ambient light region, which are used to determine an estimate, are illustrated as a CIE luminance histogram. The non-ambient light dominant color is summarized as the median or medial color in the non-ambient light region as well as a measure of the deviation. A threshold is then determined for separating the captured black image into an ambient light region and a non-ambient light region (e.g., mean plus 3 standard deviations). The revised threshold is subtracted from the captured image to identify the ambient light reflections.

An alternative method for estimating the reflected ambient light without turning the displays off includes measuring multiple screens having different gray levels. For many displays, ambient light reflections are substantially constant across different uniform displayed colors. On the other hand, non-uniformities are grayscale-dependent. Given a current estimate of the non-ambient light region, this region is applied to a capture of a higher-grayscale gray image. The ambient light is estimated from this captured image if the displayed gray value is estimated in the likely ambient light region.

An estimate of the ambient light is determined by interpolating or extrapolating from the flanking non-ambient light values. For example, bilinear interpolation may be applied from the flanking values. Alternatively, the interpolation technique may be guided by a template that is derived from an ideal display. The template may incorporate factors such as the display viewing-angle effects. By accounting for viewing-angle effects, the values extrapolated from the flanking non-ambient areas may be brighter or dimmer depending on the behavior of the viewing-angle characteristics of the ideal display (e.g., a display is typically brightest at the center and due to the viewing angle, the luminance falls off near the horizontal or vertical edges). If an ambient light reflection occurs near the center of a display, then values estimated for the likely ambient light region are of higher luminance than what might otherwise be predicted by simple interpolation.

After values estimated for the likely ambient light region are determined, this image is regarded as having the expected ideal, dark-room display measurement values. The estimated values are subtracted from the measured image to form estimated ambient light at the given gray level. Repeating this process across a range of gray levels leads to a plurality of estimates of the ambient light reflections. A plurality of estimated values over a range of different display levels may be combined by weighted multiplication into a single estimated value of ambient light reflection, if desired. Utilizing a plurality of estimated values across gray levels enables more accurate estimation of ambient light reflections. This is because mura effects can be better removed relative to relying on an ambient light reflection estimate derived from a single gray level (such as corresponding to a black image).

Figure 12:
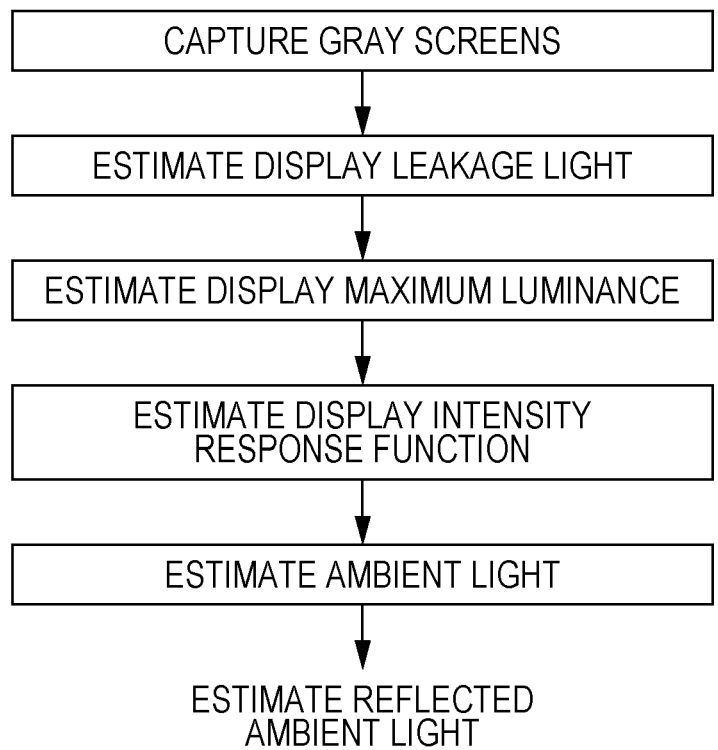
FIG. 12 is a diagram illustrating estimation of ambient light reflections through estimation of leakage light and gamma values using a display model.

A method for estimating the reflected ambient light without turning the displays off is illustrated in FIG. 12. This also uses measurements across all gray levels and knowledge of the display operation of the displays. For illustrative purposes, each of the displays is assumed to exhibit gamma-characteristic-like behavior, where the measured luminance is proportional to the displayed level raised to a power. A measured image I of a display under high-ambient lighting conditions can be decomposed, as given by Eq. (1), assuming that fixed ambient light is added to each display response. In Eq. (1), v denotes a gray level, taking a value greater than or equal to 0 and less than or equal to 1.

[Math. 1]

$$I(V)_{meas}(V)_{disp}+I_{amb} \qquad (1)$$

Here, $I(v)_{disp}$ in Eq. (1) is approximated as in Eq. (2). In Eq. (2), f( ) denotes the luminance response function of the display, where x is a vector of CIE XYZ values. The leakage light is the CIE XYZ values measured for a black screen and, for a backlit display, represents the amount of backlight transmitted by the LCD elements. It is further assumed that the display approximates a gamma function.

[Math. 2]

$$I(v)_{disp}=f(v,x_{white})\approx(x_{white}-x_{leakage})v^{\gamma}+x_{leakage} \qquad (2)$$

Considering the luminance Y only for Eq. (2), Eq. (3) is given.

[Math. 3]

$$Y(v)_{meas}\approx(Y_{white}-Y_{leakage})v^{\gamma}+Y_{leakage}+Y_{amb} \qquad (3)$$

Given estimated values of the leakage light, white, and gamma values, the component for ambient light reflection may be estimated as given by Eq. (4). Thus, given estimated values of the display white, leakage light, and gamma values, the measured values are compensated for to determine an estimate of the ambient light present at each pixel.

[Math. 4]

$$Y_{amb}\approx Y(V)_{meas}-(Y_{white}-Y_{leakage})v^{\gamma}+Y_{leakage} \qquad (4)$$

The luminance image of the leakage light in a low-ambient-light region is estimated in the following way.

(a) The estimation is performed by identifying the non-ambient light region using a fixed threshold, with probabilistic refinement, if desired. A specific example will be described with reference to FIG. 13(a) and FIG. 13(b). FIG. 13(a) indicates $Y_{black}$<1 cd/m². That is, in FIG. 13(a), a white area is a likely non-ambient light region, and this area is indicated to have a luminance less than 1 cd/m². FIG. 13(b) illustrates a region represented by the following expression.

$$\left|\frac{Y-\bar{Y}}{\sigma}\right|<3 \qquad \text{[Math. 5]}$$

That is, a spot is illustrated which is obtained by, at each of the spots on a display device, subtracting the mean luminance for the entire display device from the luminance at the spot, further dividing the result by the standard deviation of the luminances in the entire display device to determine the absolute value of the resulting value, and identifying a spot having a value less than 3.

(b) The estimation is performed by summarizing the leakage light by a single value (e.g., mode, median, or weighted or average) or by a spatially-varying value at each pixel. FIG. 13(c) illustrates a luminance histogram in a low-ambient-light region.

An image of gamma values may be estimated in the low-ambient-light region by fitting a gamma value to the normalized luminance response curve (measured luminance as a function of gray value), where the normalized tonal response curve at each pixel is given by:

$$Y_N = \frac{(Y_{meas}-Y_{leakage})}{(Y_{white}-Y_{leakage})} \qquad \text{[Math. 6]}$$

Figure 14A:
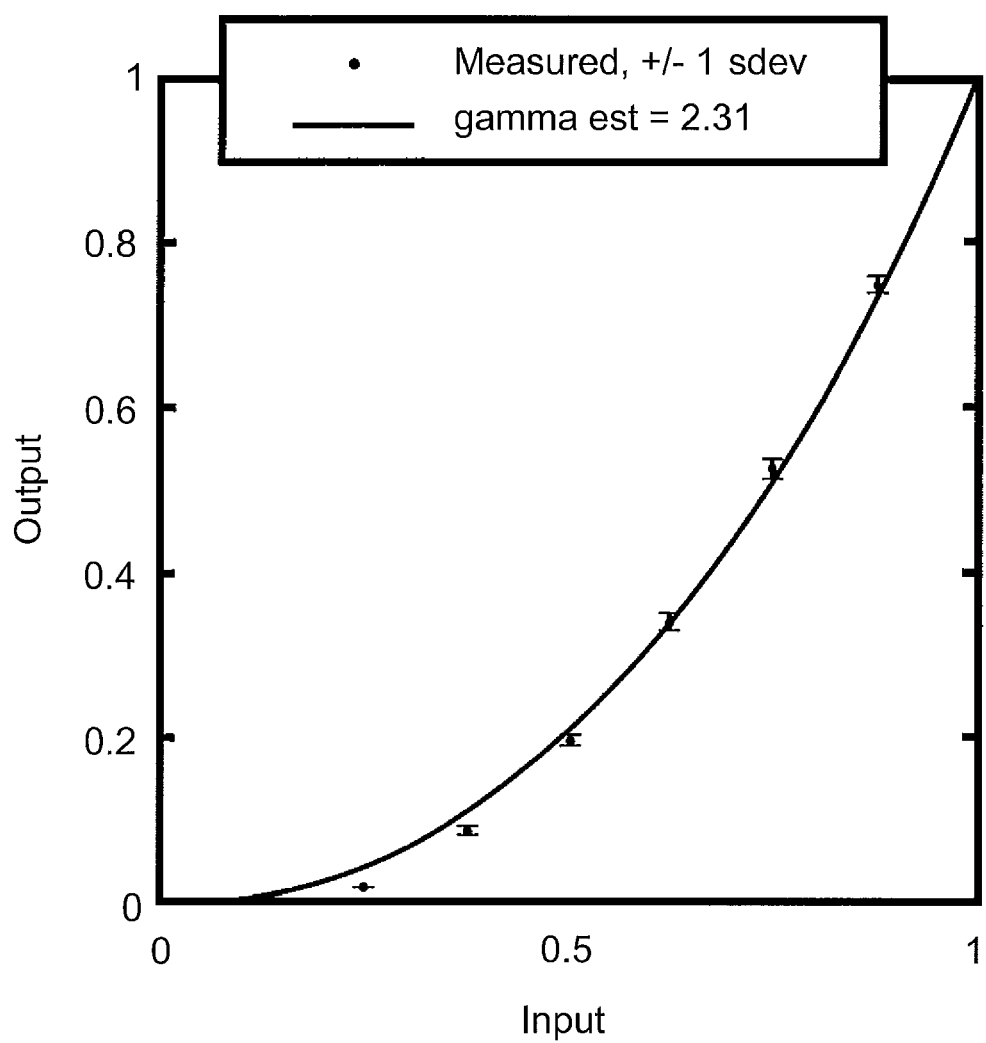
FIG. 14A is a diagram illustrating gamma value estimation.
Figure 14B:
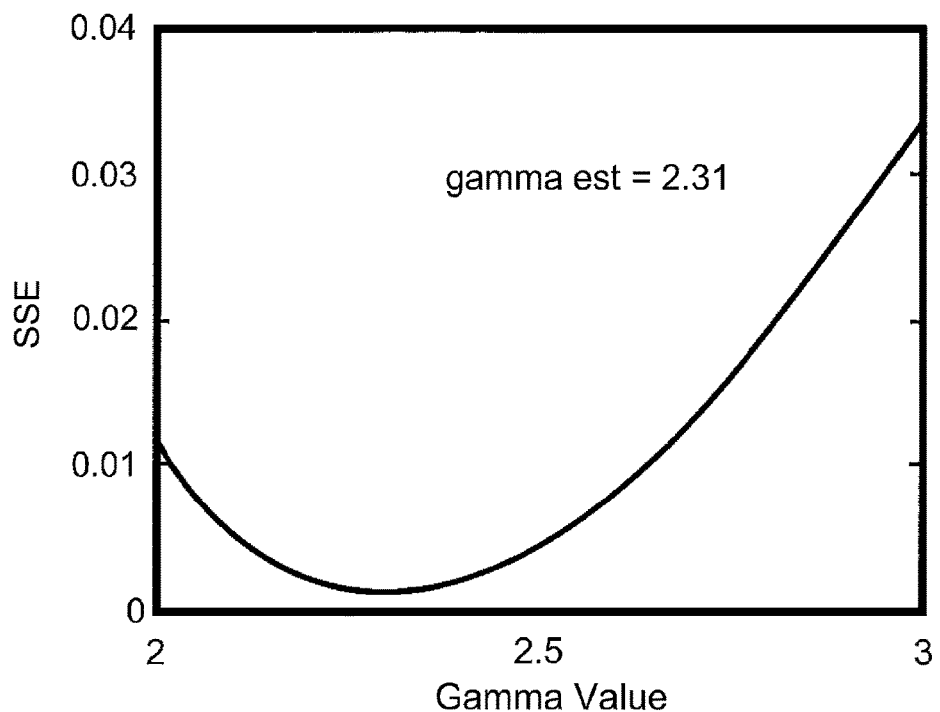
FIG. 14B is a diagram illustrating gamma value estimation.

FIG. 14A and FIG. 14B illustrate gamma values estimated from the non-ambient light pixels. FIG. 14A is a graph with the input plotted on the horizontal axis and the output plotted on the vertical axis. Further, the mean normalized luminance with respect to gray levels is plotted, with +/−1 standard deviation error bars. The fitted gamma curve is depicted as the solid line. FIG. 14B is a graph depicting the sum-of-squared error as a function of gamma value, with the gamma values plotted on the horizontal axis and the sum-of-squared errors plotted on the vertical axis. In this example, for a given display, a gamma value of 2.31 is provided as the best fit to the normalized gray luminance in the non-ambient light region.

The assumption of a gamma-like display model is not necessary, although many displays are designed to exhibit this type of behavior since standardized color spaces (e.g., sRGB) are based on it. Alternatively to assuming a gamma-like display model, an arbitrarily shaped luminance response function for a display may be used for the display if known in advance, or an empirically-derived tone response function may be used, if desired. Such a customized luminance response function may improve accuracy by reducing errors due to the deviation from gamma-like behavior by a display.

A color-measurement device may include some automatic gain and exposure control capabilities. However, when a device of this type is used for accurate color measurement, it is preferable to disable automatic control features and dynamically set all the camera parameters via programmatic control. Preferably, the gain parameter is set to the lowest possible to reduce the effect of camera noise and adjust the camera shutter time to control the exposure so that the whole camera-captured image will not be over-exposed (e.g., saturated). The captured camera sensor values may then be normalized by the exposure time to enable comparison across exposure times. Thus, longer exposure times lead to reduced noise in the captured images for dark color, and enable correspondingly higher color accuracy measurement.

Ambient light reflections interfere with this process of controlling camera exposure, particularly for darker colors, where the ambient light reflections may have a relatively large contribution. Given the ambient light reflection conditions that might produce strong specular reflections as viewed by the camera, a technique for controlling the camera shutter time for image capture is used to increase the accuracy of display color measurement for all the display screens on the video wall.

Figure 15:
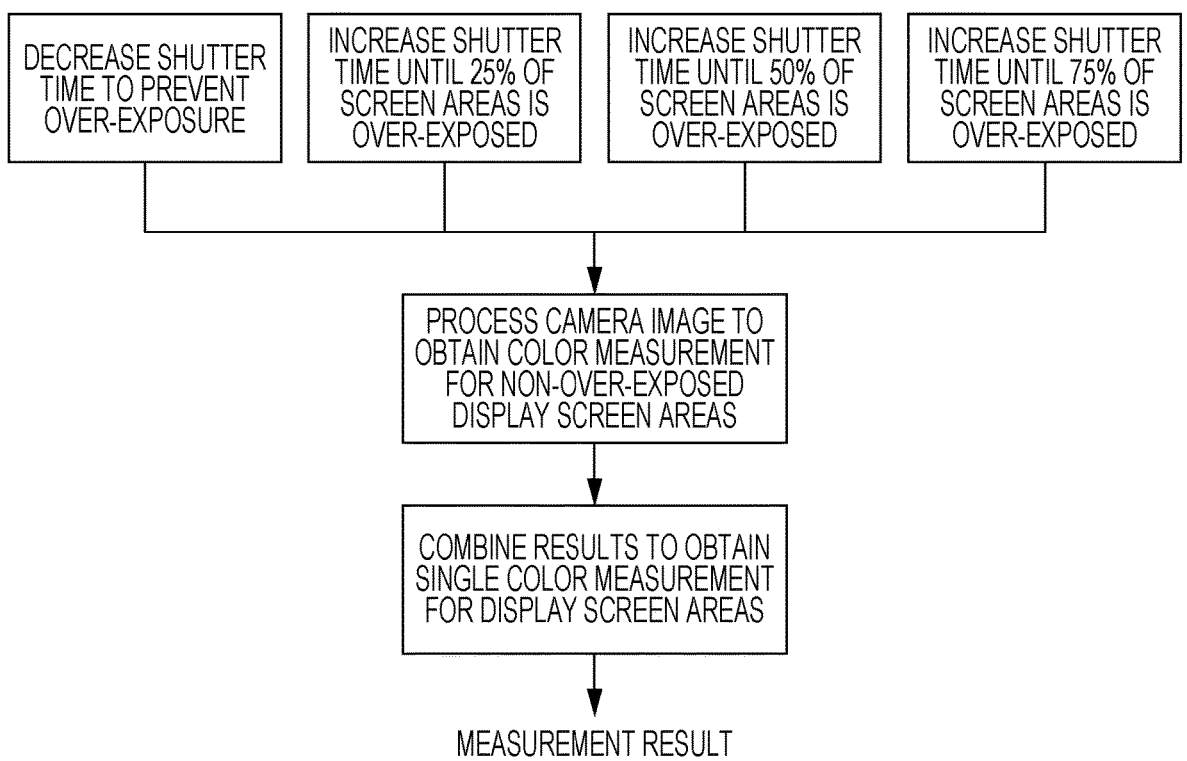
FIG. 15 is a diagram illustrating a technique for controlling shutter time for color measurement.

FIG. 15 illustrates a specific example of controlling the camera shutter time. The system starts with a sufficiently short shutter time to ensure that the whole camera image is not over-exposed. The camera image is then processed to obtain pixel-by-pixel screen images for all the display screens and the screen images are then converted into colorimetric images.

However, color measurement obtained using a short shutter time is less accurate. The system then progressively increases the shutter time so that portions of the screens are over-exposed. The partially over-exposed image is processed and more accurate color measurements are obtained for the portions that are non-over-exposed pixels. Finally, the results from measurements using a plurality of shutter times are combined to create a single color measurement for all the display screens, where the result using the longest shutter is used. This procedure produces an accurate capture of the display screens even in the presence of higher (stronger) levels of ambient light reflections.

If the specular reflections are too strong, a very short shutter time may be used to ensure that the image is not over-exposed, which will make the color measurement itself not very accurate for the screen areas with strong specular reflections. Therefore, alternative processing techniques are desirable. In general, the screen areas that are exposed are areas that do not include substantial reflections. Also, the screen areas that are compensated for are areas that do not include substantial reflections, and permit even regions with substantial reflections to blow out as a result.

Figure 16:
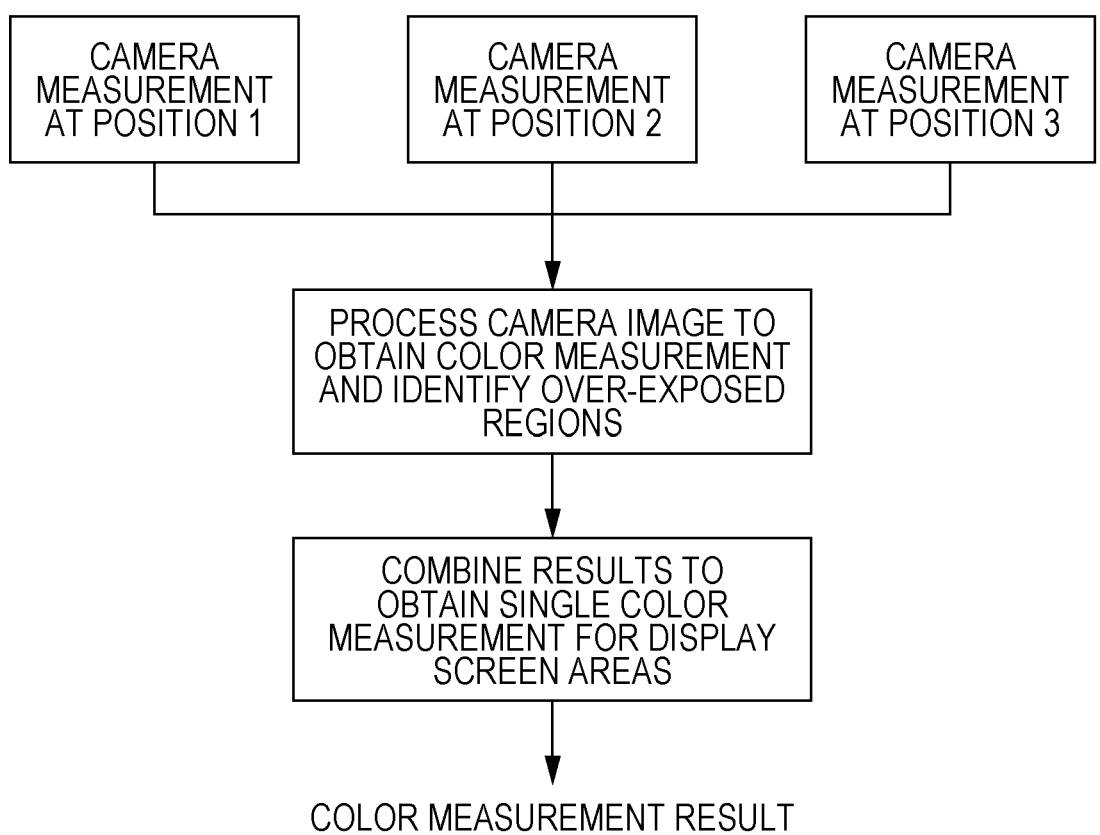
FIG. 16 is a diagram illustrating an alternative technique for controlling shutter time for color measurement.

Referring to FIG. 16, an alternative technique is illustrated to change the camera position to produce another measurement value. Since specular reflection is sensitive to the camera viewing angle, changing the camera position slightly can cause the strong specular reflection areas to shift to different locations on the display screens. The system analyzes the color measurement results from different camera positions and combines them into a single result for all the display screens.

The method of combining captures from a plurality of vantage points is enabled by having a plurality of pose calibrations for the camera positions. Given the pose calibrations, the camera pixel locations are mapped to screen pixel locations, enabling the results from a plurality of vantage positions to be combined into a single estimated display captured image.

Given the system to estimate the ambient light reflections in an image, the calibration operator is informed of the accuracy issue caused by the bright ambient light reflections, and is able to select a position for avoiding overlapping specular reflections.

Other alternatives include avoiding the strong specular reflections in display color calibration. Since only color measurement from several spots on the screens is needed for multi-display color calibration, the system uses neighboring spots, where there are no specular reflections, to do the calibration if the original spots are in the areas with specular reflections. For mura correction, the system detects the strong specular reflection areas and excludes the areas from mura correction processing. Then the results of the mura correction for those areas are interpolated from results for the neighboring areas using techniques similar to those described above for estimating the image of the ambient light reflections.

By way of example, color management may be applied by the display device. Image data is received in a standard or defined color space and is processed by the display device to produce a desirable color output.

By way of example, color management may be applied by a display controller, which resides separately from the display (e.g., in a display driver on a connected computer or in a graphics card of a connected computer, or as an intermediate device distinct from the display or a computer that drives the display). In this case, the color or uniformity processing may be applied in the display controller. The output image data from the display controller is in a device color space (e.g., device-dependent RGB or device-dependent YCbCr) and applied to the display device.

By way of example, color management may be applied to the content prior to being transmitted to the display controller which then may be applied to the display device. The content is constituted by image data, video data, or drawing commands according to an API (e.g., a graphic drawing interface of an operating system, PDF/PostScript drawing commands, or HTML/SVG commands). A software application that controls the content may apply color management to the content prior to transmitting the content or rendering the content to the display controller.

In general, any image that is modified for subsequent display on a display is also referred to as content to be displayed.

Another embodiment is now provided. In this embodiment, FIG. 7A and FIG. 8 are replaced with FIG. 17. In this embodiment, first, for ambient light, ambient light characteristics are calculated from a captured image. Then, the display characteristics of a display device are calculated by removing the ambient light characteristics from the captured image containing ambient light.

First, to determine the ambient light characteristics, an image capture device captures an image of one or more displays under ambient light and detects the captured image as a first captured image. The one or more displays are in turned-off state or present a first display image.

The first captured image does not need to be a single image and may be constituted by a plurality of captured images that are captured at shifted times. Alternatively, the first captured image may be a captured image of the entirety of the one or more displays or a captured image of a portion of the one or more displays.

The first captured image is an image for determining the ambient light characteristics. The less the effect of the display characteristics, the more desirable it is to determine the ambient light characteristics. It is thus desirable to use a black image or an image having a gray level close to black as the first display image.

The black image is that obtained with, in the case of a liquid crystal display device, the backlight of the display completely turned off or the liquid crystal held in a black display state, which means in either case that there is no display on the screen. The gray level means a state where the screen is displayed at uniform luminance so as to achieve a predetermined luminance value lower than that in white display.

The first captured image is an image captured by the image capture device in the way described above, or is, in other words, information indicating the two-dimensional coordinates of each pixel segmented out in the imaging resolution of the image capture device and the corresponding luminance or chromaticity level.

The luminance or chromaticity level is, by way of example, a grayscale value of luminance or chromaticity in color space information (color system) such as a CIE XYZ value or CIE Lab. In another example, an RGB color system may be used. In color space information (color system) such as CIE XYZ values or CIE Lab, luminance information and chromaticity information are not described using individual grayscale values, but a single grayscale value includes both luminance information and chromaticity information. Such a description method may be used.

Figure 17:
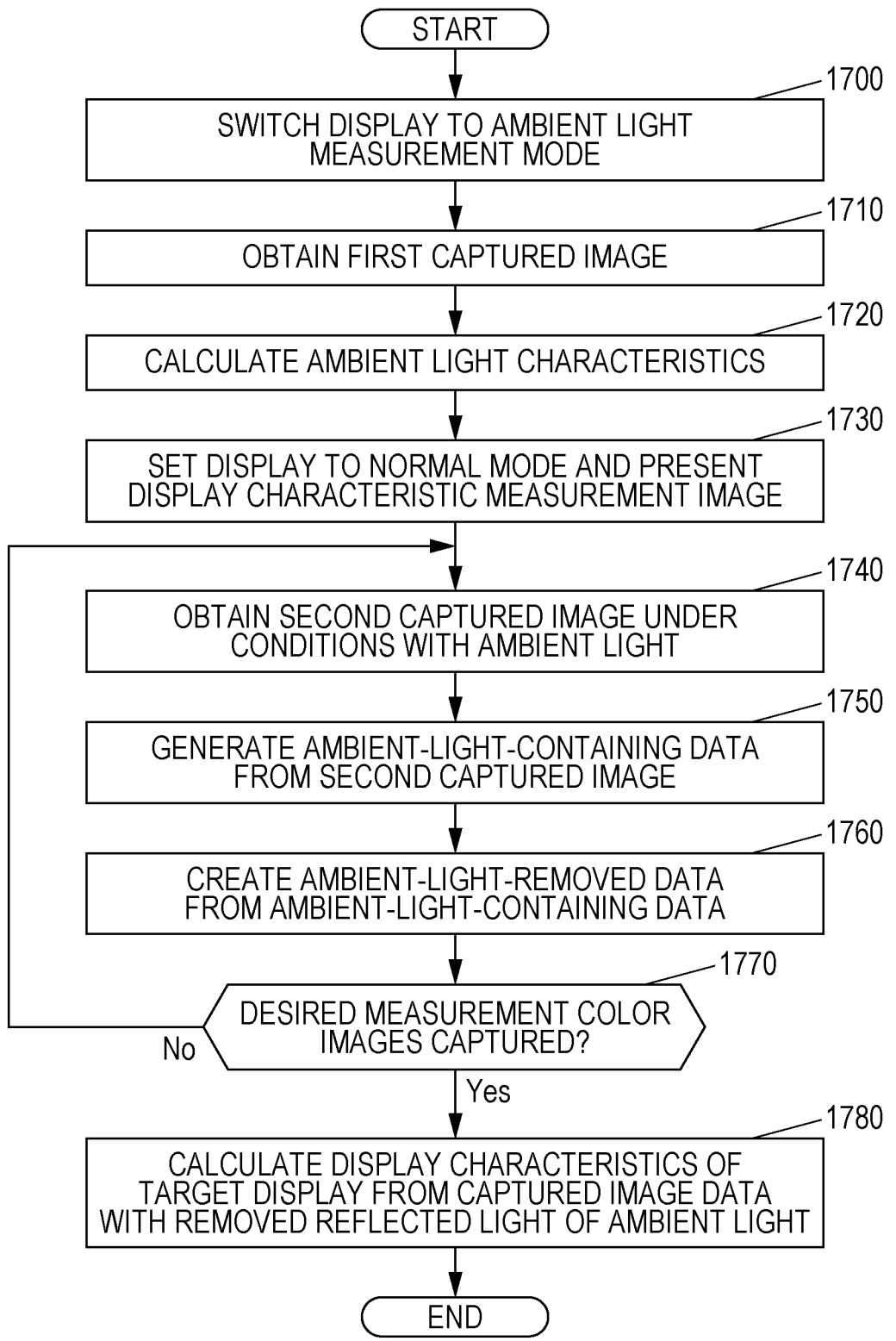
FIG. 17 is a diagram illustrating a processing procedure of a display correction system according to another embodiment.

Referring to FIG. 17, a process flow for determining the display characteristics of a display will be described. First, the display is switched to an ambient light measurement mode (1700), and an image capture device captures an image of a display screen of the display (1710).

The ambient light measurement mode of the display refers to a mode of changing the mode of the display device, such as turning off a target display for which an image is to be captured, turning off the backlight, or reducing luminance, or of displaying a first display image (e.g., "black image") on the display as an ambient light measurement image, under ambient light. In the ambient light measurement mode, the display screen is the so-called "black screen", which allows only the ambient light reflections to be captured within an image. The characteristics of the reflected ambient light can thus be calculated from the image. That is, the image captured in step 1710 is a first captured image for determining the ambient light characteristics.

Then, the characteristics of ambient light (ambient light characteristics) are calculated based on the first captured image (1720). The ambient light characteristics means information on the degree of the effect of ambient light at each of a plurality of spots on the display device, which is calculated from the first captured image. That is, the ambient light characteristics are calculated and determined using the characteristics of reflected light of the ambient light for the display device.

The characteristics of ambient light are calculated using luminance or chromaticity distribution information from the first captured image. The characteristics of light may be calculated from a captured image by using camera-specific information, examples of which include image capture conditions such as the shutter speed and the aperture, and information on the lens, such as the amount of surrounding light.

In this embodiment, the degree of the effect of ambient light is represented as the luminance or chromaticity level. Specifically, a value is used which is obtained by subtracting a luminance or chromaticity level displayed and measured in a darkroom with no ambient light under the same display conditions (a known value measured in advance) from a luminance or chromaticity level actually measured in the first captured image under ambient light.

The simplest method for calculating ambient light characteristics is to use characteristics, which are calculated from the first captured image, as ambient light characteristics. This method is effective especially when the effect of optical characteristics due to the light output from the display is sufficiently small and negligible and other factors are also negligible.

However, this method is not limiting. For example, ambient light characteristics may be obtained by subjecting the first captured image to the following processing. For example, when an exposure time is set in conditions for capturing the first captured image, the exposure time may be used to perform normalization (conversion to a value when fitted to a specific same exposure time that is different from the actual exposure time).

If the effect of optical characteristics due to the light output from the display on the first captured image is not negligible, processing may be performed to remove the effect from the first captured image. For example, when a black image is presented as an ambient light measurement image, turning the backlight on may affect the measurement of ambient light. In this case, the effect related to the backlight may be removed and then the ambient light characteristics may be calculated and determined.

Additionally, the ambient light characteristics are not necessarily determined at the same resolution as that of the first captured image. The resolution may be decreased, if necessary, and the ambient light characteristics may be determined at a lower resolution spot.

In this case, the ambient light characteristics of a pixel corresponding to a designated spot may be extracted based on the first captured image and used as the ambient light characteristics for the designated spot. As another method, the average value of the ambient light characteristics of pixels in an area including a pixel corresponding to a designated spot and neighboring pixels may be determined as the ambient light characteristics of the designated spot. Specifically, a screen is two-dimensionally segmented equally into regions whose center portions are defined as designated spots to extract the ambient light characteristics of the pixels.

In general, since high-resolution correction data is necessary for correction of mura such as luminance mura or chromaticity mura within a display device, it is desirable that the ambient light characteristics be also determined at high resolution. In contrast, lower-resolution correction data may generally be sufficient to calibrate the luminance value or chromaticity at a predetermined position in the display device.

By way of example, the resolution at which an image is captured can be switched in accordance with the mode of display correction. For example, in a display correction mode for a single (sole) display, the image capture device 300 is set to high resolution (e.g., an image size of 10 Mpixels) to capture an image. In a display correction mode for multiple (a plurality of) displays, the image capture device 300 is set to low resolution (e.g., an image size of 2 Mpixels) to capture an image.

In the display correction mode for multiple displays, an image of each of the display devices may be captured or an image of the entirety of the displays may be captured. Further, although an image to be captured has a single size (resolution), the resolution may be converted for processing. That is, in a multi-display mode, processing may be performed with reduced resolution.

For multiple displays, furthermore, it is desirable to determine the ambient light characteristics at, within a first display device and a second display device that are adjacent to each other, both a first spot near a screen edge in the first display device and a second spot adjacent to the first spot and near a screen edge in the second display device. In this case, high-accuracy calibration can be performed in the border of the first display device and the second display device.

Then, a captured image without the ambient light characteristics is generated. Specifically, the image capture device 300 captures a second captured image with a second display image displayed as an image for measuring display characteristics (display characteristic measurement image) on a display for which the first captured image has been captured. The second captured image may be constituted by a plurality of images that are captured at shifted times. Alternatively, the second captured image may be a captured image of an entirety of one or more displays or a captured image of a portion of the one or more displays.

The second captured image is an image for acquiring correction data to, after the removal of the effect of the ambient light characteristics, subsequently perform luminance or chromaticity correction (calibration) as display correction. The correction includes, in addition to correction performed to provide appropriate luminance or chromaticity at a predetermined position on the display, mura correction for performing correction to provide a uniform two-dimensional luminance or chromaticity distribution within the display surface. The second captured image includes both the display characteristics of the display and the ambient light characteristics.

In the second captured image, the display characteristics of the display with removed effect of the ambient light characteristics are used as correction data. Thus, as opposed to the first captured image, in the second captured image, the effect of the display characteristics is desirably larger. It is therefore desirable to select, as the second display image, which is a display characteristic measurement image displayed on the display, an image on which the display characteristics have a larger effect than on the first display image, which is an ambient light measurement image.

Examples of the second display image include a white image, a grace level image having greater luminance than the first display image, and an image of any single color selected from the primary colors of RGB or a mixture thereof. Alternatively, as the second display image, a pattern image other than an image that is uniform across the display, such as a stripe-like pattern or a chessboard-like pattern, in accordance with the purpose. The second display image is not necessarily a single image and may be constituted by a plurality of images. A plurality of images, each of which is a captured image of one of the second display images, may be used as the second captured image.

The second captured image is an image captured by the image capture device in the way described above, or is, in other words, information indicating the two-dimensional coordinates of each pixel segmented out in the imaging resolution of the image capture device and the corresponding luminance or chromaticity level.

The luminance level is, by way of example, a grayscale value of luminance. The chromaticity level is, by way of example, a grayscale value of luminance and chromaticity, respectively, in color space information (color system) such as a CIE XYZ value or CIE Lab. In another example, an RGB color system may be used. In this respect, the second captured image is common to the first captured image. The difference is a difference in the display image to be presented on the display, as described above.

Specifically, referring to FIG. 17, the display is set to a normal mode and then presents a second display image as a display characteristic measurement image (1730).

Here, setting the display to the normal mode refers to changing to a normal display mode by, for example, turning the display on when the display is in turned-off state, turning the backlight on when the backlight is in turned-off state, or increasing the luminance if the luminance is low. Then, the image capture device 300 captures an image of the target display under ambient light to obtain the second captured image (1740).

The ambient light in an environment where the image is captured in step 1710 needs to be substantially the same as that in an environment where the image is captured in step 1740. This is because a large change in ambient light may make appropriate removal of ambient light not feasible.

Then, ambient-light-containing data, which is characteristics before the removal of ambient light, is generated from the second captured image (1750). That is, the display characteristics of the display under ambient light include the ambient light characteristics superimposed on the display characteristics specific to the display.

The ambient-light-containing data may be generated from the second captured image by using a method equivalent to the method described above for determining the ambient light characteristics from the first captured image. Here, the second captured image may be used directly as the ambient-light-containing data, or the second captured image may be processed in the way described above to obtain the ambient-light-containing data.

Then, ambient-light-removed data, which is characteristics with removed effect of the ambient light characteristics, is created from the ambient-light-containing data (1760). The ambient-light-removed data may be created from the ambient-light-containing data by, by way of example, subtracting, from the characteristics (e.g., luminance or chromaticity values) of the ambient-light-containing data, the ambient light characteristics (the luminance or chromaticity values correspondingly).

The method for creating the ambient-light-removed data from the ambient-light-containing data may be any method for at least making the effect of ambient light on the ambient-light-removed data less than on the ambient-light-containing data, and any similar method other than the subtraction described above may be used.

For example, if the luminance or chromaticity value in the data does not have linearity with respect to the actual luminance or chromaticity, simple subtraction is not established. Thus, with the subtraction, a more complex method may be used in accordance with actual situations, such as weighting each luminance or chromaticity value in consideration of non-linearity.

The method for creating the ambient-light-removed data from the ambient-light-containing data is not limited to the method described above for removing the effect of the ambient light characteristics from the ambient-light-containing data in the actual spatial domain.

Alternatively, a method may be used for removing the effect of the ambient light characteristics from the ambient-light-containing data after temporarily converting actual spatial domain data into frequency domain data by using a Fourier transform technique. In this case, the effect of ambient light varying at a specific frequency is easily removed.

When a plurality of second display images are present, it is determined whether desired measurement color images have been captured, since the ambient-light-removed data needs to be created for all the second display images (1770). If the desired measurement color images have not been captured (1770; No), the subsequent measurement color image is presented on the display as a second display image to create ambient-light-removed data. For example, after ambient-light-removed data is created with a specific single-color image presented as a second display image, ambient-light-removed data is also created for any other necessary single-color image.

Examples of the case where a plurality of second display images are present include a case where the process described above needs to be performed on each of the single-color images of RGB. In this case, the process of creating ambient-light-removed data is performed on single-color images of all the RGB colors in a sequential manner.

When a plurality of second display images are present, ambient-light-removed data is not necessarily created for each of the second display images. The process flow may be changed, as desired, such that a piece of ambient-light-containing data is created for each of the second display images and then a piece of ambient-light-removed data is created for each of the pieces of ambient-light-containing data.

Then, if the desired measurement color images have been captured, the display characteristics specific to the display, with removed effect of ambient light, are calculated from the created ambient-light-removed data (1770; Yes→1780). After that, the display is subjected to luminance or chromaticity correction using the calculated data. In the case of a single measurement color, the characteristics output as the ambient-light-removed data described above are the display characteristics specific to the display. When a plurality of measurement colors (i.e., second display images) are present, the ambient-light-removed data determined for the plurality of measurement colors is used to calculate and determine the display characteristics of the display. The display characteristics of the display may be calculated using any known technique, which will not be described in detail.

Further, display correction is performed on the display based on the calculated display characteristics of the display. Display correction is a process for correcting various settings of the display, such as the luminance, chromaticity, grayscale values, and color temperature, to set the display so as to output suitable colors or to eliminate or reduce color mura, luminance mura, or the like to provide uniform output. At this time, the display characteristics output in this process are used to perform display correction. In specific display correction, the method provided in any other of the embodiments described above or any known method may be used.

When a plurality of second captured images are present, furthermore, display correction (luminance or chromaticity correction) does not need to be performed on the display after all the processes up to step 1770 in the process flow are complete. The process flow may be changed, as desired, such that display correction (luminance or chromaticity correction) is performed on the display at the time when at least one of the display characteristics of the display necessary for the display correction of the display is obtained.

That is, according to this embodiment, display correction (luminance or chromaticity correction) can be performed on the display using the methods illustrated in FIG. 4 and FIG. 5 by utilizing display characteristics with removed effect of ambient light. Color calibration, mura correction, or the like can be performed as display correction based on the display characteristics specific to the display with removed effect of ambient light, reducing the effect of the ambient light characteristics even if an image of the display is captured remotely under ambient lighting conditions.

Furthermore, it may be determined whether the conditions for ambient light are identical in environments where the first captured image and the second captured image are captured. For example, the time taken to capture the first captured image and the time taken to capture the second captured image are different by an amount greater than or equal to a predetermined time, it may be determined that ambient light is likely to change, and the process may be encouraged to be performed again from the beginning.

Moreover, an illuminometer, an exposure meter, a color meter, or the like may further be connected to the display correction system. If the illuminance or color temperature varies over a predetermined range or more, it may be determined that ambient light has changed, and the process may be encouraged to be performed again from the beginning.

While embodiments of the present invention have been described in detail with reference to the drawings, the specific configurations are not limited to those embodiments and designs and the like without departing from the gist of the present invention are also included in the claims.

Furthermore, the display correction of a display device described above may be performed by the display device itself (i.e., a display device including a display correction apparatus). Alternatively, any other computer or a terminal device may be connected to a display device and may perform display correction of the display device connected thereto.

For example, an application for performing the display correction described above may be installed into a smartphone or tablet incorporating a camera function as a display correction apparatus and may be executed. Furthermore, a captured image may be transmitted to a server, and the server may control the display correction of a display device.

For the display correction of a display device, parameters may be changed by hardware in the display device to perform the correction, or software may perform the display correction.

In the embodiments of the present invention, the use of a flat panel display as a display device has been described in detail. It goes without saying that the claimed invention may be applied to any other display device. For example, a projector may be used as a display device. In this case, an image capture device captures images of the place of projection to be performed by the projector during the projection time and during the non-projection time. Then, the characteristics of the projector may be determined from the captured images, and the projector may be adjusted so that the desired display can be realized.

Further, a program operating on each of the devices in the embodiments described above is a program for controlling a CPU or the like (a program for causing a computer to function) to implement the functions of the embodiments described above. Information handled in these devices is temporarily accumulated in a temporary storage device (e.g., a RAM). Then, the information is stored in a storage device such as an HDD or SSD (solid state drive) and read by the CPU, if necessary, for modification or writing.

When distributed to the market, the program can be stored and distributed on a portable recording medium or transferred to a connected server computer via a network such as the Internet. In this case, it goes without saying that a storage device of the server computer is also included in the present invention.

REFERENCE SIGNS LIST 300 image capture device
310 display
320 computer

The invention claimed is:

1. A display correction apparatus for performing display correction of a display device having a display screen on which an image is displayable, comprising:
    ambient light characteristic calculation means for calculating ambient light characteristics from a first captured image of the display screen obtained when the display device is in an ambient light measurement mode;
    under-ambient-light display characteristic calculation means for calculating display characteristics of the display device under ambient light from a second captured image of the display screen obtained when the display device is in a normal mode;
    display characteristic calculation means for calculating display characteristics of the display device by removing the ambient light characteristics from the display characteristics of the display device under ambient light; and
    display correction means for performing display correction based on the display characteristics of the display device, wherein
    the ambient light measurement mode includes at least one of turning the display device off, turning a backlight of the display device off, or presenting a first display image, and
    the first display image is a black image.

2. The display correction apparatus according to claim 1, wherein the normal mode is a mode in which the display device presents a second display image.

3. The display correction apparatus according to claim 1, wherein the ambient light characteristics are calculated, based on luminance or chromaticity distribution information, from the first captured image.

4. A non-transitory computer readable medium that stores a program for causing a computer, which performs display correction of a display device having a display screen on which an image is displayable, to execute:
    an ambient light characteristic calculation function of calculating ambient light characteristics from a first captured image of the display screen obtained when the display device is in an ambient light measurement mode;
    an under-ambient-light display characteristic calculation function of calculating display characteristics of the display device under ambient light from a second captured image of the display screen obtained when the display device is in a normal mode;
    a display characteristic calculation function of calculating display characteristics of the display device by removing the ambient light characteristics from the display characteristics of the display device under ambient light; and
    a correction function of performing display correction based on the display characteristics of the display device, wherein
    the ambient light measurement mode includes at least one of turning the display device off, turning a backlight of the display device off, or presenting a first display image, and
    the first display image is a black image.

5. A display correction system comprising an image capture device, a display device having a display screen on which an image is displayable, and a display correction apparatus that performs display correction of the display device, wherein
    the image capture device
    transmits to the display correction apparatus a first captured image of the display screen obtained when the display device is in an ambient light measurement mode, and
    transmits to the display correction apparatus a second captured image of the display screen obtained when the display device is in a normal mode, and
    the display correction apparatus
    calculates ambient light characteristics from the first captured image received from the image capture device,
    calculates characteristics of the display device under ambient light from the second captured image received from the image capture device,
    calculates display characteristics of the display device by removing the ambient light characteristics from the display characteristics of the display device under ambient light, and
    performs display correction of the display device based on the display characteristics of the display device, wherein
    the ambient light measurement mode includes at least one of turning the display device off, turning a backlight of the display device off, or presenting a first display image, and
    the first display image is a black image.

* * * * *